Oct. 21, 1941.   H. W. JONES   2,259,956
BLOWPIPE APPARATUS
Filed Jan. 6, 1940   6 Sheets-Sheet 3
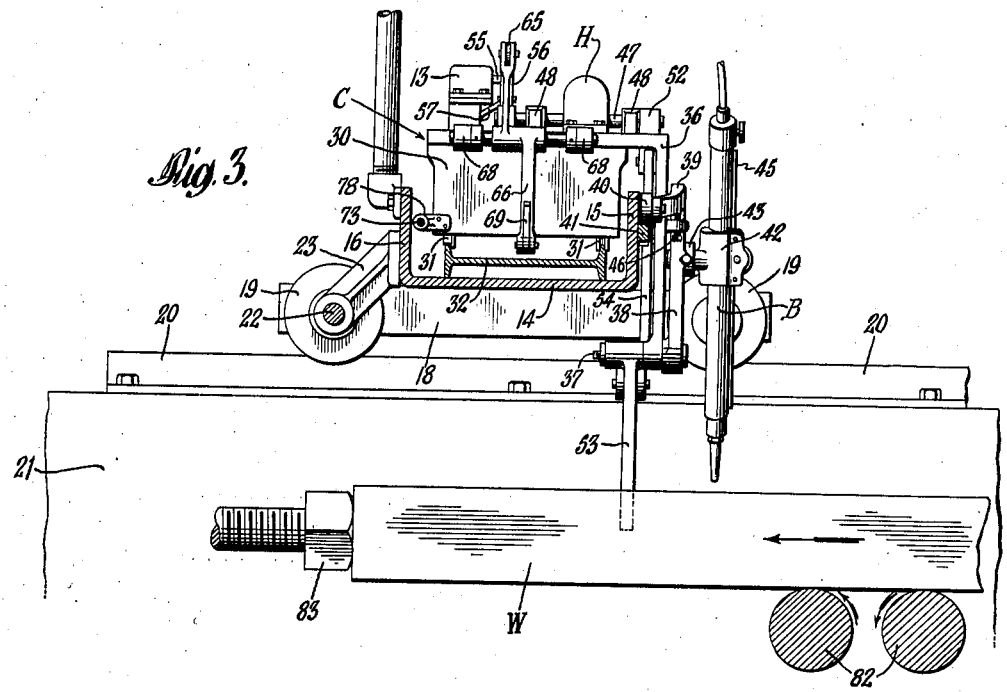
INVENTOR
HOMER W. JONES
BY
ATTORNEY

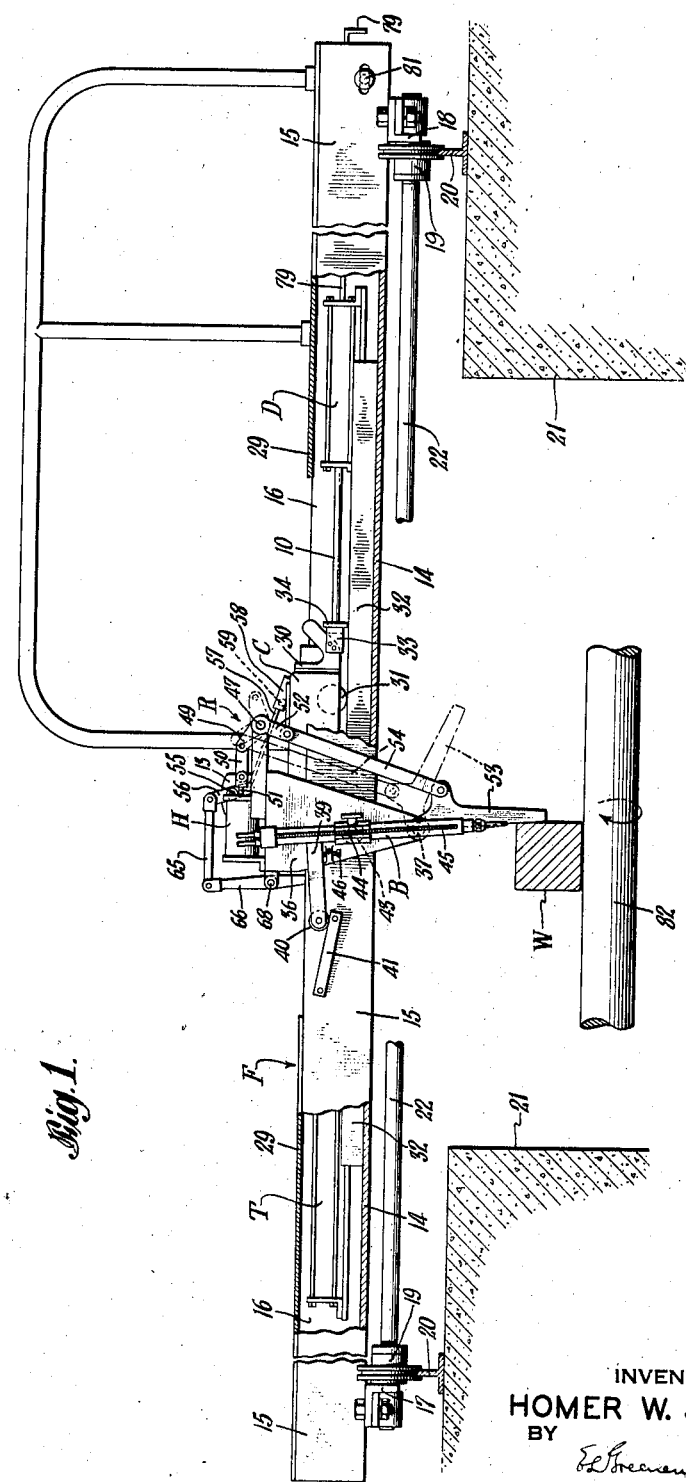

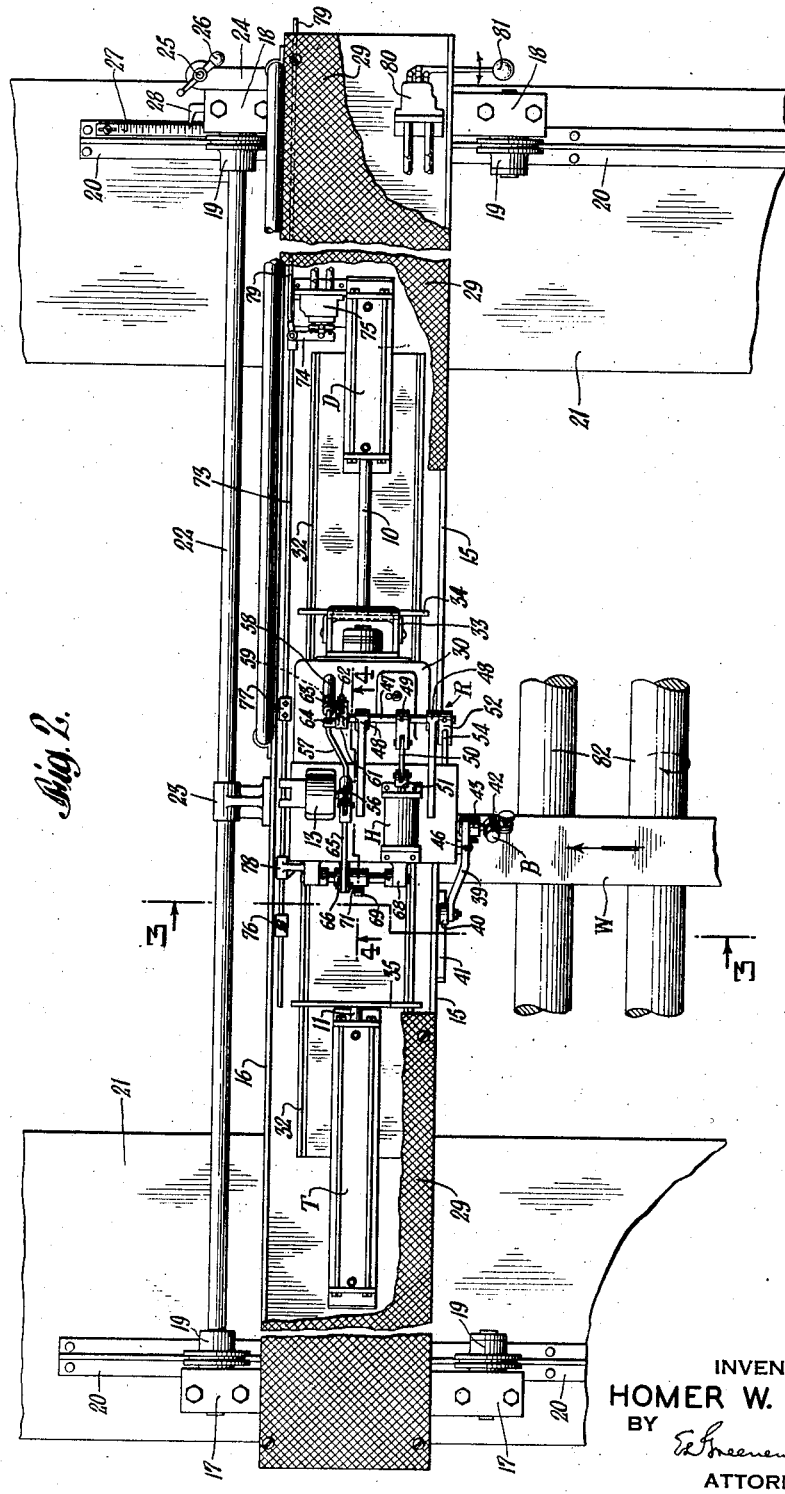

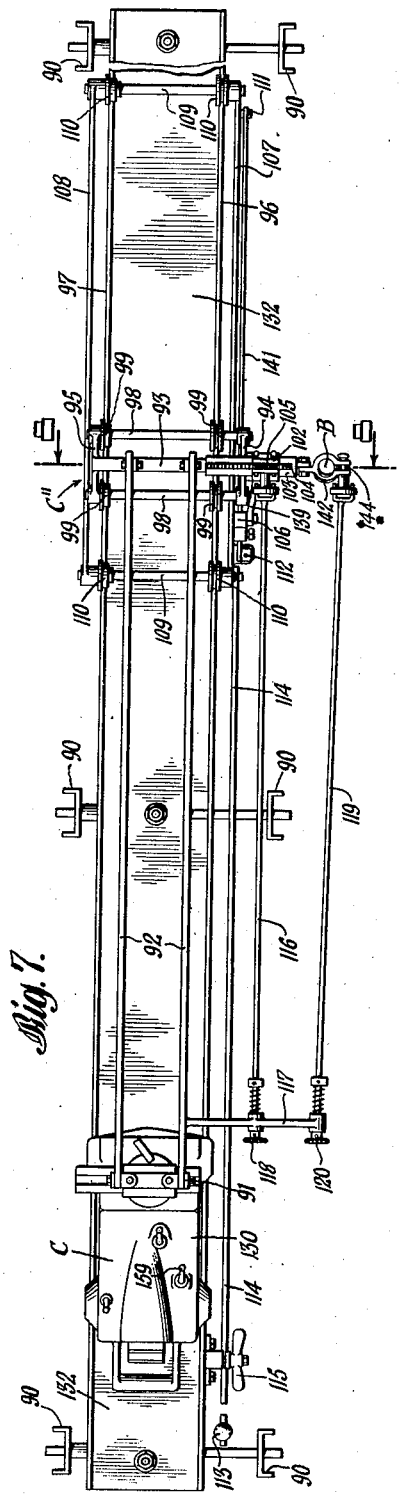

Oct. 21, 1941.     H. W. JONES     2,259,956
BLOWPIPE APPARATUS
Filed Jan. 6, 1940     6 Sheets-Sheet 5
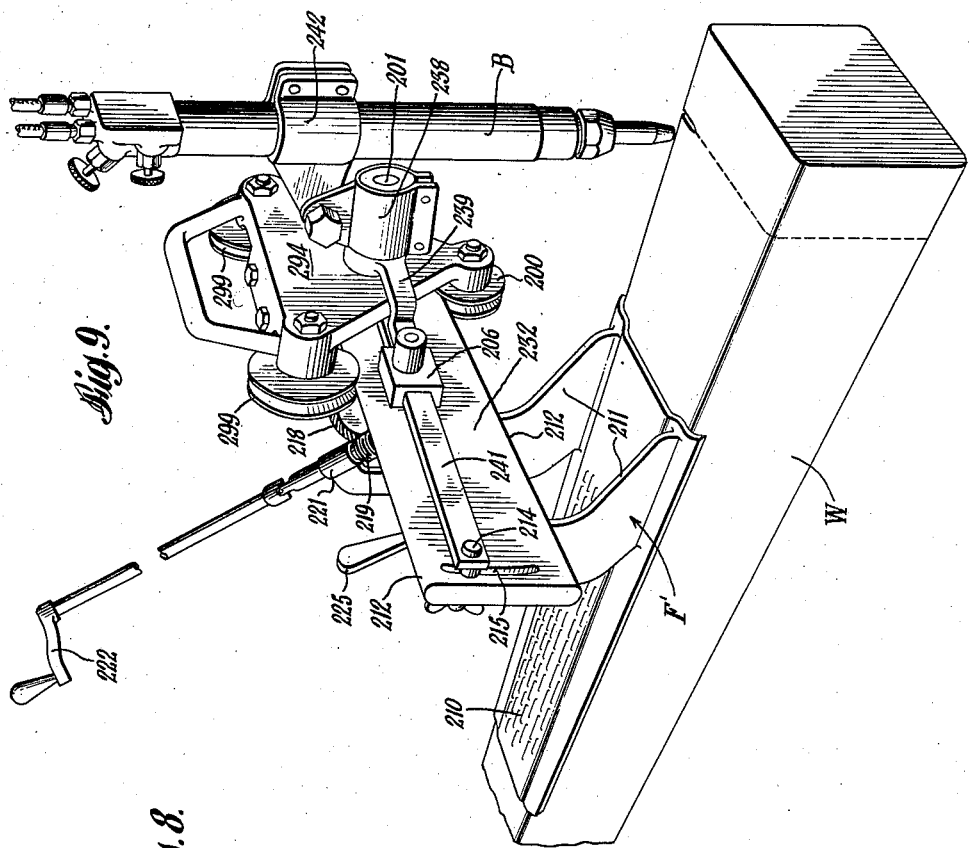
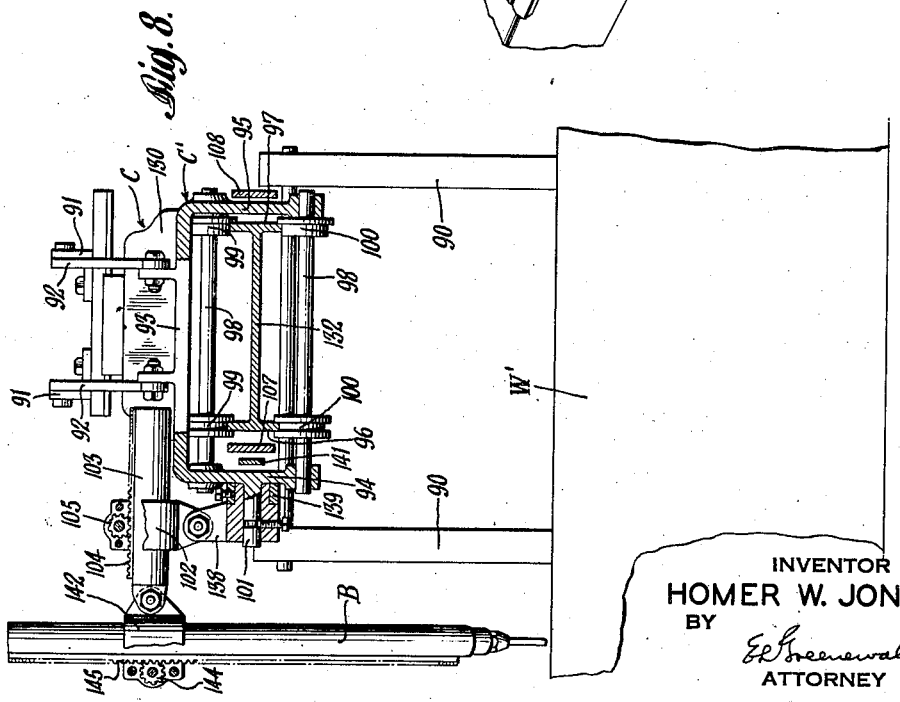
INVENTOR
HOMER W. JONES
BY
ATTORNEY

INVENTOR
HOMER W. JONES
BY
ATTORNEY

Patented Oct. 21, 1941

2,259,956

UNITED STATES PATENT OFFICE 2,259,956

BLOWPIPE APPARATUS

Homer W. Jones, Westfield, N. J., assignor to The Linde Air Products Company, a corporation of Ohio Application January 6, 1940, Serial No. 312,678

25 Claims. (Cl. 266—23)

This invention relates to blowpipe apparatus and more particularly to apparatus for rapidly severing elongated metal stock by means of a gas-cutting blowpipe.

Billets and bars, and the like, are customarily cut while hot in steel mills by heavy shears or large mechanical saws. Such mechanical methods of cutting have a number of disadvantages such as; high power requirements, the necessity of providing heavy mechanism and foundations, lack of flexibility and portability, the necessity of frequent resharpenings or replacements of cutting edges, and the production of shear burrs and saw burrs on the cut edges. It has been proposed to thermo-chemically sever metal bars while cold by an oxyacetylene blowpipe guided by hand or by a portable apparatus adapted to be mounted on round bars and to move the blowpipe in an arcuate path across the stock while maintaining the axis of the blowpipe vertical.

Blowpipe apparatus of the foregoing type does not provide a satisfactory means of cutting if the stock has a heavy rectangular cross-section and while being cut is at a highly elevated temperature. While making the necessary adjustments of such apparatus, the operator is continually subjected to heat from the stock. Further difficulties in adjusting the apparatus arise when it is desired to cut stocks of different diameters and when it is desired to cut stocks which are not round in transverse cross-section but are substantially square or rectangular.

In order to sever the billets rapidly, it is desirable to move the blowpipe relatively fast. Rapid movement, however, tends to cause the lower portions of the kerf to lag behind the upper portions and when the kerf reaches the edge of the work an uncut lower corner portion will remain. To completely sever the metal and at the same time move the blowpipe at a relatively high cutting speed, the blowpipe is not maintained vertical throughout the cut but is forwardly inclined initially, and backwardly inclined at the finishing end of the kerf. This change of inclination counteracts the effect of accumulating cutting lag so that the billet is completely severed at high speed. Such method of cutting is described in my copending application Serial No. 312,677. Accordingly, the present invention provides cutting apparatus which includes; an improved means for varying the angular relation of a cutting blowpipe with respect to rectangular bar stock while moving the blowpipe transversely of the stock and along one surface thereof from one edge to the other edge at a relatively rapid rate; and suitable mechanism for rapidly positioning the blowpipe to start a cut, for automatically shutting off the gases on the completion of a cut, for regulating the degree of angularity of the blowpipe, and for controlling the operation of the blowpipe at a safe distance from highly heated bar stock.

The principal objects of the present invention are; to provide apparatus including a gas-cutting blowpipe for rapidly and efficiently cutting elongated metal stock such as blooms, bars, billets, and slabs; to provide such apparatus that may be controlled by the operator at a safe distance from the work when highly heated; to provide such apparatus that may be quickly and simply adjusted to cut stocks of different cross-sectional dimensions; to provide such an apparatus including means for automatically imparting transverse and arcuate motion to a gas-cutting blowpipe to insure quick starting of the cut and complete severance of the stock, to provide apparatus including means for automatically supplying an oxidizing gas to said blowpipe and means for interrupting said supply at the completion of the cut, and to provide an apparatus including means, operative in predetermined sequence, to control the transverse motion of said blowpipe.

The manner in which these and other objects are attained by the invention will be apparent from the following description and drawings in which:

Fig. 1 is a front view, partly broken away, of a preferred embodiment of the invention;

Fig. 2 is a plan view, partly broken away, of the apparatus shown in Fig. 1;

Fig. 3 is a view of a cross-section of the apparatus taken on the line 3—3 of Fig. 2;

Fig. 4 is a schematic view of the valve and clutch operating mechanism;

Fig. 5 is a fragmentary detail view of the blowpipe supporting mechanism of the apparatus of Fig. 1;

Fig. 6 is an elevational view of another embodiment of the apparatus of the invention;

Fig. 7 is a plan view of the apparatus shown in Fig. 6;

Fig. 8 is a view of a transverse section taken on the line 8—8 of Fig. 7;

Fig. 9 is a perspective view of another embodiment of the invention in the form of a portable cutting apparatus;

Figure 10:
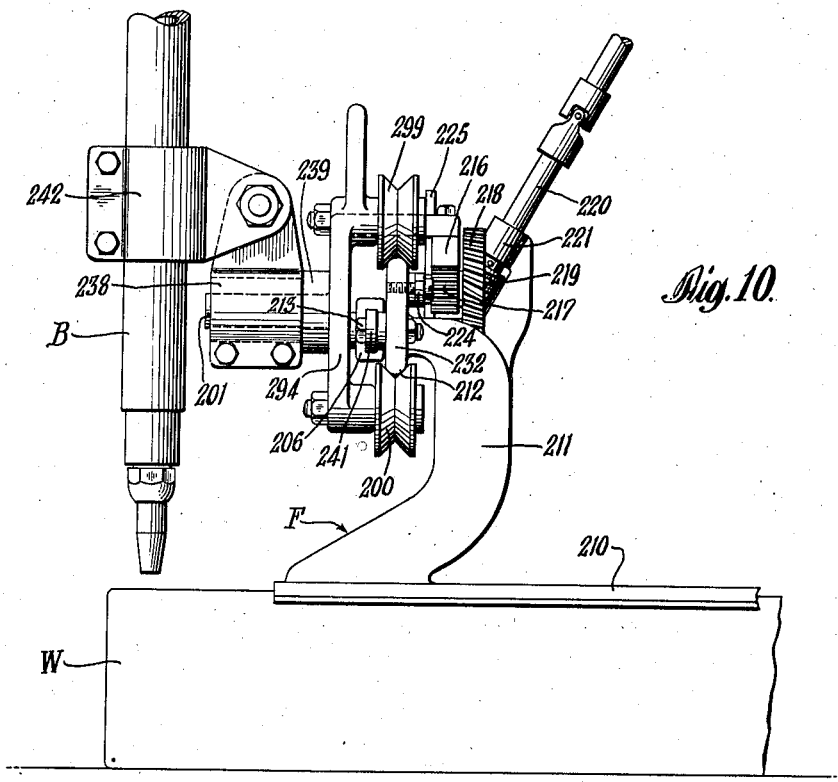
Fig. 10 is a side elevational view of the apparatus shown in Fig. 9.

The present invention will be described with respect to the cutting of solid elongated metal stock of square or rectangular cross-section, but it will be apparent as the description proceeds that the apparatus may be advantageously employed for cutting other shapes of ferrous metal.

Referring to Figs. 1 to 5, inclusive, one preferred embodiment of the invention comprises an elongated frame F which is adapted to be supported over the stock W in a position extending transversely over said stock. A carriage C which pivotally supports a gas-cutting blowpipe B in proper working relation to the stock W is mounted on the frame F and movable longitudinally therealong. During the cutting operation the carriage C travels at a predetermined speed thus carrying the blowpipe B across the top surface of the stock W at the desired relatively fast cutting speed. As the blowpipe B, which is pivotally supported upon the carriage C, moves across the stock W, an angular motion is imparted to said blowpipe so that its cutting jet moves with respect to the carriage C in an arc which has its center on the pivot axis from which the blowpipe B is suspended.

The rapid motion of the carriage C to position the blowpipe B for preheating the edge of the stock W is provided by movement of the piston rod 10 of an air pressure operated cylinder D against one end of the carriage C. The motion of the carriage C at cutting speed over the stock W during the actual cutting of said stock is provided by a motor (not shown) which is mounted within, and adapted to propel, the carriage C. At the completion of the cut the carriage C is returned to its initial position by movement of the piston rod 11 of an air cylinder T which is mounted on the frame F to act against the other end of said carriage. An air operated cylinder H mounted on the carriage C actuates a link mechanism indicated generally at R which in turn actuates a valve 13 controlling the supply of cutting oxygen to the blowpipe B and also actuates a clutch mechanism (not shown) within the housing of the carriage C and which controls the motion of the carriage C.

The frame F comprises a U-shaped channel having a bottom 14 and sides 15 and 16 (Fig. 3) and is supported at each extremity by carriages 17 and 18, respectively. The carriages 17 and 18 are provided with flanged wheels 19 which are adapted to run on parallel tracks 20 extending longitudinally parallel with respect to the stock W and supported upon suitable foundations 21. A transverse shaft 22 supported at its center by a bearing 23 interconnects the rear flanged wheels 19 of the carriages 17 and 18. One end of the transverse shaft 22 is rigidly fixed to a worm gear (not shown) enclosed in a gear housing 24 (Fig. 2), and which meshes with a worm (not shown) on a vertical shaft 25. Rotation of the vertical shaft 25, which may be effected by a crank handle 26, imparts longitudinal motion along the rails 20 to the carriages 17 and 18 simultaneously, thereby adjusting the position of frame F with respect to the work W. A scale 27, adjustably mounted on the right-hand rail 20, and a pointer 28 rigidly fixed to the carriage 18 provide a means for indicating the position of the frame F along the rails and thereby provide a gauge for determining the position of the blowpipe lengthwise of the work W so that predetermined lengths of stock may be cut off. Also if a cut has been started but not completed for some reason, and it is desired to start a new cut adjacent to the previous one, the position of the frame F may be conveniently altered by rotating the crank 26. A clamp (not shown) may be provided on the right-hand carriage 18 so that the frame F may be securely locked in the desired position. A cover 29 may be provided across the top of the frame F at each end and secured to the top edges of the sides 15 and 16 in order to protect the air cylinders D and T, and to enable the operator to walk on the frame F for making repairs to the carriage C.

The carriage C comprises a box-like frame or housing 30 provided with four wheels 31 which are guided on a track 32 extending along the inner bottom surface 14 of the frame F. The track 32 has the form of an I-beam, the flanges forming the rails on which the wheels 31 travel. Mounted within the housing 30 are a motor and a clutch mechanism (not shown) which are connected to the wheels 31 and adapted to propel said carriage along the track 32. A carriage having internal mechanism suitable for the purposes of the present invention is described in United States Patent 2,183,605 of J. H. Bucknam and A. J. Miller. Motion of the carriage C, as previously mentioned, to a point where the blowpipe B is brought into position to preheat the edge of the stock W is provided by movement of the piston rod 10 of the air cylinder D against the carriage C. A cross-bar 33 secured to the end of the carriage housing 30 acts as a bumper to contact with a similar cross-bar 34 fastened to the end of the piston rod 10 and adapted to slide along the track 32. A similar cross-bar 35 is secured to the piston rod 11 of the cylinder T.

The blowpipe B is supported on the carriage C by an L-shaped bracket 36 having a horizontal leg secured to the top of the housing 30, and a vertical leg depending downwardly a small distance in front of the side member 15. At the lower end of the bracket 36 is mounted a short horizontal shaft 37 which is parallel to the rails 20 and the work W and has portions extending forwardly and rearwardly of the bracket 36. Pivoted at its lower end to the forwardly extending portion of the shaft 37 is an upwardly extending L-shaped arm 38 having an upper portion 39 that extends to the left beyond the bracket 36. The arm portion 39 is provided with a roller 40 on its rear side for engagement with a cam bar 41 secured to the side 15 at a predetermined angle to the horizontal. A blowpipe holder 42 is adjustably secured in a horizontal socket 43 and supports the blowpipe B so that it may be angularly and vertically adjustable, the vertical adjustment being provided by a rotatable pinion 44 that engages a longitudinal rack 45 along the blowpipe. To prevent swinging of the blowpipe and the arm 38 about the pivot 37 too far to the left an adjustable stop screw 46 carried by a projection of bracket 36 is provided to engage the lower side of the arm 39. This stop screw 46 is regulated to adjust the blowpipe B at the desired angle for initiating a cut.

The clutch and valve operating mechanism R which is mounted on the carriage housing 30 comprises a transverse shaft 47 rotatably mounted in two bearings 48 (Fig. 2) which are rigidly fastened to the top of the housing 30. At a point intermediate the bearings 48, an arm 49 is rigidly fastened at one of its ends to said shaft and at its other end is pivotally connected to a link 50 which is in turn pivotally connected to the piston rod 51 of the air cylinder H. Movement of the piston rod 51 will thus impart rotation to the shaft 47, the direction of rotation being dependent on the direction of travel of said piston rod. A second arm 52 is rigidly secured to the forward extremity of the shaft 47. A guide finger 53 (Figs. 1 and 5) which is pivotally mounted on the rearward extension of the shaft 37 is connected at a point near the shaft 37 to the arm 52 through a link 54. When the shaft 47 is rotated counter-clockwise, the finger 53 is lowered, and when shaft 47 is rotated clockwise, the finger 53 is raised. Therefore, if air is admitted to the right-hand end of cylinder H the finger 53 will be lowered, and if air is admitted into the left-hand end of the cylinder H, the finger 53 will be raised clear of the stock W.

In the embodiment of the invention described herein the preheating gases are not interrupted between individual cuts but only at the completion of the entire cutting operation. The flow of cutting oxygen is, however, interrupted at the completion of each cut. To control the flow of cutting oxygen a lever-operated valve 13, (Fig. 4) provided with a horizontal stem 55 rotation of which controls the flow of gas, is mounted on the top of the carriage housing 30. A lever 56 is secured at a point intermediate its extremities to the stem 55. A rod 57 is pivotally connected at one end to the lower end of the lever 56. The other end of said rod supports a spring housing or cup 58 which is adapted to fit over the upper ball-shaped end of a clutch lever 59 extending upwardly from the housing 30. The clutch lever 59 actuates the clutch mechanism in the housing 30 which engages the drive motor of the carriage C with the driving wheels 31. A spring 60 is mounted within said cup to act as a cushion if the clutch teeth do not immediately mesh when the clutch lever 59 is shifted.

To impart motion to the rod 57 which connects the clutch lever 59 and the valve-operating lever 56, an arm 61 (Fig. 4) is provided rigidly fastened to the transverse shaft 47. A latch 62 is pivotally mounted on the end of arm 61 at a point intermediate the ends of said latch. A tension spring 63 has one end secured to the side of the arm and its other end to the rear end of the latch 62 and serves to exert a downward pressure at the forwardly extended end of said latch so that it contacts a stop collar 64 which is adjustably mounted on the rod 57. When the clutch mechanism in housing 30 is disengaged, the clutch lever 59 will be in the position shown by solid lines on Fig. 4 and the latch 62 will be in a position to contact the stop 64. When the transverse shaft 47 is rotated in a clockwise direction, due to entrance of air into the left-hand end of the cylinder H, the latch 62 will press against the stop 64, thereby causing the rod 57 to move to the left. Motion of the rod 57 to the left also moves the clutch lever 59 to the left (shown by broken lines in Fig. 4) to engage the clutch and thus to move the carriage C across the stock W at cutting speed. When the stop 64 and the latch 62 have moved to the positions indicated by dotted lines in Fig. 4, further turning of the transverse shaft 47 will have no effect on the clutch lever 59 or valve 13.

The movement of the rod 57 also actuates the valve lever 56 and thus introduces a supply of cutting oxygen to the blowpipe B. To maintain the valve lever 56 in the "on" position during the cutting operation, it is pivotally connected through a link 65 and a vertical lever 66 to a latching member 67. The vertical lever 66 (Fig. 4) is pivotally mounted at a point intermediate its extremities to a bearing 68 on one end of the carriage housing 30. The latching member 67 comprises a vertical leg 69 and a horizontal leg 70 which is notched at its extremity. An expanding spring 71 is interposed between the vertical leg 69 and the vertical lever 66 so that an upward pressure is continually exerted by the notched extremity 70 against the bottom end portion of the housing 30. A stop 72 fastened to the end of the housing 30 prevents the vertical lever 66 from striking said housing. When the valve lever 56 is actuated by movement of the link 65 to the right, the notched extremity of the horizontal leg 70 will engage the edge of the carriage housing 30 and thus maintain the valve lever 56 in the "on" position and oxygen will continue to flow to the cutting blowpipe B. Engagement of the latching member 70 also serves to maintain the clutch lever 59 in the forward position so that the clutch cannot be disengaged until the latching member 70 assumes its initial position.

To control the flow of air under pressure to the cylinder T which serves to return the carriage C to its original position after the completion of a cut, a rod 73 is slidably supported adjacent to and along the track 32 (Fig. 2). One end of the rod 73 is pivotally connected to the handle 74 of an air valve 75 which is mounted at the right-hand position of the frame F. The rod 73 is provided with two stop collars 76 and 77 which are contacted by a bracket 78 rigidly fastened to the carriage housing 30. The bracket 78 slidably encloses the rod 73 at a point intermediate the two stops 76 and 77 so that when the blowpipe B has completely traversed the work the bracket 78 contacts the leftward stop 76 and moves the rod 73 to the left. This movement actuates the valve handle 74 and admits air to the left-hand end of the air cylinder T, thus causing the piston rod 11 to move to the right. The piston rod 11 of cylinder T moves the cross-bar 35, guided by the track 32, against the vertical leg 69 (Fig. 4) of the latching member 67 compressing the spring 71 and releasing the notch of the leg 70 from the edge of the housing 30. Further movement of the cross-member 35 to the right pivots the vertical lever 66 against the stop 72 and moves the valve lever 56 to interrupt the flow of cutting oxygen and disengage the clutch by movement of the clutch lever 59 to the right. Further movement of the cross bar 35 to the right pushes the carriage C back to its initial position. When this position is reached, the bracket 78 contacts the stop 77 and moves the rod 73 to the right which reverses the valve and causes air to flow into the right-hand end of the cylinder T thus returning the piston rod 11 and the cross-bar 35 to their normal retracted positions. An extension 79 of the rod 73 is also pivotally connected to the valve handle 74 so that if for any reason the operator desires to return the carriage C to its initial position after a cut has been started but not completed he may do so by pushing the handle 74 to the left thus attaining the effect of contact of the bracket 78 with the stop 76.

The flow of air to the cylinders D and H is controlled by a three-position air valve 80 controlling four air lines, two of which are connected to the cylinder H and two of which are connected to the cylinder D. The valve 80 is so constructed that when air is admitted to one end of either of the air cylinders D or H the opposite ends of said cylinders will be connected to exhaust ports. The valve 80 is operated by a hand lever 81 movable into any of three positions, the central position being the inoperative or shunt position and the extreme positions operating the cylinders D and H. The work W which may be a rectangular billet is preferably supported upon rollers 82 of a conveyor. The frame, roll driving means, and other parts of the conveyor, are not shown in the interests of clearness of the drawings. If the billets are to be cut into pieces of equal length a stop gauge 83 (Fig. 3) suitably supported may be provided. The billets are moved along the conveyor until their ends contact the stop 83 and after each cut the billets are moved up to the stop for cutting off another length. A close adjustment of the length to be cut is obtained by positioning the frame F with the scale 27.

The operation of the apparatus described herein, assuming that the carriage C is in its retracted or normal position, that all adjustments have been made and the preheating gases have been ignited, is as follows:

The operator opens the valve 80 by moving lever 81 to one extreme position to admit air to the right-hand ends of the air cylinders D and H. The air cylinder H is not throttled, therefore, its piston immediately moves to the left. Such movement turns the transverse shaft 47 in a counter-clockwise direction which lowers the finger 53 and positions the latch 62 to the rear of the stop 64. During this operation, the carriage C is being moved to the left by the pressure of piston rod 10 of the air cylinder D against the bumper 33 of the carriage. Motion of the carriage C continues until the finger 53 contacts the edge of the stock W thus effectively preventing further motion of the carriage by the cylinder D. The blowpipe B has previously been adjusted so that the nozzle end will be the proper distance above the work surface. The stop screw 46 will also have been adjusted so that the blowpipe is inclined forwardly a desired degree to provide rapid starting of the cut.

When, in the operator's judgment, a portion of the edge of the stock W has become heated to its ignition temperature, the operator reverses the valve 80 to its opposite extreme position which now introduces air into the other ends of the air cylinders D and H, thus causing the rod 10 of the cylinder D to move to the right to its normal position, and causing the piston rod 51 of the cylinder H to move to the right for rotating the transverse shaft 47 in the clockwise direction. Clockwise rotation of the shaft 47 raises the finger 53 clear of the stock W, and causes the latch 62 (Fig. 4) to force the stop 64 and the rod 57 to the left shifting the clutch handle 58 to the left and engaging the clutch of the carriage C thus starting said carriage in its movement at cutting speed across the stock W. The same movement of the rod 57 also actuates the oxygen valve 13 which introduces the cutting oxygen to the blowpipe B and locks the latching member 70. The shaft 47 continues to turn in a clockwise direction a sufficient distance for the latch 62 to slip past the stop 64. As the carriage C continues to move automatically across the stock W at cutting speed, the roller 40 contacts the upper cam surface of the bar 41 and slowly tilts the blowpipe B back through the vertical position to a rearwardly inclined position, the cam 41 being set so that the blowpipe will have the proper inclination to completely sever the billet.

When the blowpipe B has completely traversed the stock W the bracket 78 contacts the stop 76 thereby moving the valve handle 74 to admit air to the left-hand end of air cylinder T. The piston rod 11 (Fig. 2) and therefore the cross-member 35 moves to the right and contacts the latching member 69 thus causing the horizontal leg 70 of said member to disengage the edge of the carriage housing 30. Further movement of the piston rod 11 pivots the vertical lever 66 which moves the link 65 to interrupt the flow of cutting oxygen, and also moves the clutch lever 59 to disengage the clutch mechanism. The lower extremity of the vertical lever 66 is not capable of movement farther than the stop 72, therefore, further pressure of the cross-member 35 against said lever causes the carriage C to return to its retracted or normal position.

When the carriage C reaches its normal position the bracket 78 contacts the stop 77 and actuates the valve handle 74 thus causing air to enter the right-hand end of the cylinder T which returns the piston rod 11 to its normal position. This completes the cutting cycle.

A second arrangement of apparatus, according to the invention, is illustrated in Figs. 6, 7, and 8, in which the I-beam shaped track 132 is shown stationarily supported upon supporting columns 90 and the motor-driven carriage C is mounted on the track at a substantial distance away from the blowpipe supporting mechanism. The housing 130 of the carriage C is provided with an upwardly extending bracket 91 to which is pivoted a pair of elongated arms 92 that extend for a substantial distance along the track 132 to a point over the surface of the billet W'. The right-hand ends of the arms 92 are pivotally connected with the frame 93 of an auxiliary carriage C'. The frame 93 extends transversely of the track 132 and has secured at each end thereof triangular-end plates 94 and 95. The end plates 94 and 95 depend downwardly from the frame member 93 adjacent the outside surfaces of the flanges 96 and 97 of the track 132. The triangular plates 94 and 95 are joined by three axles 98, two of which are above the track 132 and carry flanged wheels 99 that run on the upper edges of the flanges 96 and 97 and one axle below the track 132 which carries wheels 100 that engage with the lower edges of the track 132. The triangular plate 94 has an outwardly extending pivot 101 extending therefrom upon which is journaled an upwardly extending arm 138 to the upper end of which is adjustably secured a holder 102. The holder 102 encircles a horizontal bar 103 which is provided with a rack 104 along its upper surface. The holder 102 is also provided with a pinion 105 that meshes with the rack 104 and which may be rotated to horizontally adjust the bar 103 and thereby regulate the distance of the blowpipe B from the track 132. At the outer end of the bar 103 is adjustably secured the blowpipe holder 142 by which the blowpipe B may be angularly positioned and vertically adjusted by turning the pinion 144 that meshes with the rack 145 along the blowpipe. The pivoted end of the arm 138 is provided with a boss to which is adjustably secured the end of a laterally extending arm 139, the outer end of which is pivoted to a slider 106 that is arranged to slide along a cam bar 141. The cam bar 141 is mounted adjacent the outside surface of an elongated carriage C'' having elongated side members 107 and 108. The side members 107 and 108 are joined at each end by axles 109 extending transversely above and below the track 132 and having flanged wheels 110 that are adapted to run along the upper and lower edges of the flanges 96 and 97. The side member 108 is disposed outside of the end plate 95 while the side member 107 is disposed between the end plate 94 and the flange 96; thereby the carriage C' may travel throughout the length of the carriage C'' between its axles 109. The cam bar 141 is mounted on the side plate 107, being pivoted thereto at one end 111 and vertically adjustable thereon at its other end by an adjusting screw 112 which threadedly engages a projection of the side member 107. Thus, by turning the screw 112, the cam bar 141 may be adjusted to have the desired angle with respect to the horizontal.

The position of the carriage C'' on the track 132 may be changed as desired by the operator by a handle 113 secured to the left-hand end of a rod 114, the right-hand of which is secured to the side member 107. The position of the carriage C'' is locked by tightening a clamp 115 secured to the track 132 and arranged to clamp the bar 114 as desired. To turn the pinion 105 and thus regulate the position of the blowpipe B longitudinally with respect to the billet W', the pinion is secured to an extension shaft 116 that extends to the left to a position adjacent the carriage C where it is supported by a bracket 117 extending laterally from the arm 92. The end of the shaft 116 is provided with a hand wheel 118. To adjust the vertical position of the blowpipe B, the pinion 144 is provided with an elongated operating shaft 119 also extending to and supported by the bracket 117. The shaft 119 is provided with a hand wheel 120. The conduits supplying gases to the blowpipe B (which are not shown in the interests of clearness of the drawings) may be provided with control valves at a point convenient to an operator adjacent the carriage C.

To operate the apparatus just described for severing a billet, the operator will move the handle 113 to properly position the carriage C'' with respect to the work W' and lock the carriage C'' in that position by tightening the clamp 115. By means of the handwheels 118 and 120 and by positioning the carriage C along the track 132, the operator will position the blowpipe B at the right-hand edge of the work W for preheating a portion of the edge of the work to an ignition temperature. When the blowpipe is properly positioned and preferably forwardly inclined, the preheating gases are turned on and the heating flames will be ignited by the hot surface of the billet. If the billet should not be hot enough, however, other means such as a pilot flame may be employed to effect ignition. When, in the operator's judgment, the metal at the edge of the work has been sufficiently heated, the oxidizing gas will be turned on and the clutch lever 159 shifted to engage the motor in the carriage C with the wheels 131 of the carriage so that the carriage will move to the left at the desired cutting speed and pull the carriage C' with the blowpipe thereon to the left at cutting speed to sever the billet W'. When the blowpipe B is positioned at the right edge of the work W' it will be forwardly tilted at the desired angle. As the blowpipe moves to the left the cam bar 141 will move the end of the arm 139 upward and progressively tilt the blowpipe back to the vertical position and then tilt it to a rearward inclination which is sufficient to completely sever the work W' when the blowpipe reaches the finishing end of the kerf which position is shown in the drawing. Because of this change of angular relation, the blowpipe may be moved at a relatively high cutting speed so that rapid and complete severance of the billet may be obtained. As soon as the blowpipe completes the kerf, the operator will shut off the gases and shift the clutch lever 159 into the neutral position. The billet W' may then be removed or repositioned for another cut.

Figure 11:
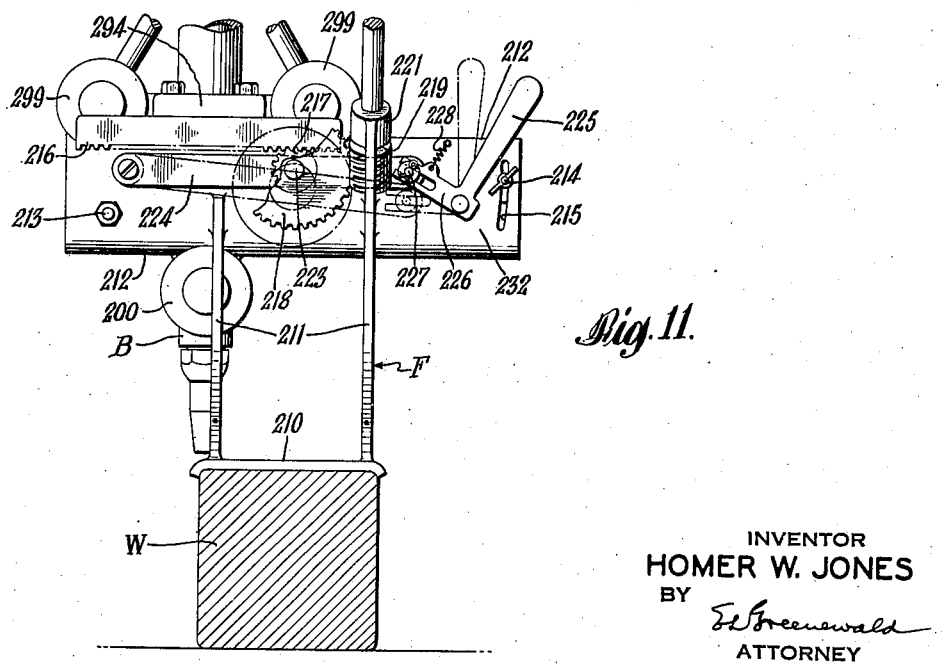
Fig. 11 is a rear elevational view with parts broken away of the apparatus shown in Fig. 9.

In Figs. 9 to 11, inclusive, is illustrated a further embodiment in the form of a portable cutting apparatus which is adapted to be moved to and placed upon the billets to be cut. This apparatus comprises a frame F'' having a base portion 210 that is adapted to rest on the top surface of a billet and to provide a tread upon which an operator may stand. The forward portion of the base has two uprights 211 which support a horizontal track member 232 having upper and lower ways 212. A carriage in the form of a triangular plate 294 is adapted to move horizontally along the track 232 and is supported on the track by a pair of flanged wheels 299 which engage the upper way 212 and a flanged wheel 200 adapted to engage the lower way 212. The carriage member 294 is provided with a laterally extending pivot 201 upon which is pivoted the laterally extending arm 239. The outer end of the arm 239 is pivoted to the slider 206 that encloses and slides along the cam bar 241. The cam bar 241 is pivoted at one end to a pivot 213 at one end of the track 232 and is supported at its other end by a bolt 214, the position of which may be vertically adjusted along a slot 215 cut through the track 232. The upright arm 238 is clamped to the hub portion of the arm 239 and at its upper end there is pivotally secured the blowpipe holder 242.

The means for driving the carriage member 294 along the track 232 comprises a rack 216 (Fig. 11) mounted at the upper portion of the member 294 and extending along the rear side of the track 232. The rack 216 meshes with a pinion 217 journaled on a shaft extending laterally from the back of the track 232. A worm gear 218 is secured to the pinion 217 and arranged to mesh with a worm 219 which is mounted at the end of a drive shaft that extends diagonally upwardly over the base 210. The lower end of the drive shaft 220 is journaled in a bearing 221 secured to the left-hand upright 211 and the upper end of the shaft 220 is provided with a crank handle 222. To disengage the pinion 217 from the rack 216 when it is desired to shift the carriage member 294 for quick adjustment, the shaft 223 is secured to the mid portion of a bar 224 that is pivoted at one end to the back of the track 232 and is vertically movable at its other end by a bell crank 225. The bell crank 225 is pivoted to the back of the track 232 and has an arm 226 which is slotted for engagement with a pin 227 on the end of the bar 224. A spring 228 may be provided to maintain the pinion 217 in engagement with the rack 216.

To operate the apparatus shown in Figs. 9 to 11, inclusive, the operator places the device on top of the billet to be cut in a position so that the blowpipe is longitudinally in the position where the kerf is to be made. The operator then holds the crank 225 to the right so that the pinion 217 is disengaged from the rack 216 and shifts the carriage member 294 so that the blowpipe nozzle is accurately located with respect to the edge of the work. The heating gases are then turned on and ignited. When the edge of the billet has reached the ignition temperature the oxidizing gas is turned on and the crank handle 222 is rotated at the proper speed to traverse the blowpipe across the work at the desired cutting speed. When the blowpipe completes the cut the gases are shut off and the device moved to a position for making another cut. During the cutting the slider 206 moving along the cam bar 241 will raise the end of the arm 239 so as to gradually change the inclination of the blowpipe B from a forward inclination at the beginning of the cut to a backward inclination at the finish of the cut.

In the copending earlier filed application, Serial No. 303,188 of George H. Smith and Lloyd W. Young, there is described and claimed a blowpipe apparatus for severing bar stock including a track disposed transversely of the stock; a carriage movable along the track; a blowpipe supported on the carriage in position to direct gas against the stock; and means including the track for continuously changing the angular position of the blowpipe with respect to a transverse axis of said stock during the cutting operation. According to the disclosures of such copending application, the change of angular position is accomplished by an arrangement other than by a cam device disposed adjacent the track which device can be adjusted independently of the track as described herein, and furthermore the angle change provided according to such copending application is opposite in character to that provided according to the present invention.

From the foregoing description it will be seen that by the present invention there is provided a efficient apparatus for relatively rapidly as well as completely severing ferrous metal bodies. The embodiments described herein and illustrated in the drawings indicate how the invention may be applied. Certain features of the invention disclosed herein may be used independently of others, and numerous changes may be made in the details of the apparatus without departing from the principles of the invention. For example, certain features of the apparatus may be employed to operatively support and move blowpipes other than kerf-cutting blowpipes such as flame machining, heating, and welding blowpipes.

I claim:

1. Apparatus for thermo-chemically cutting ferrous metal bodies which comprises blowpipe means for projecting oxidizing gas against a surface of such body; a carriage; means for supporting and guiding said carriage in a direction parallel to said surface; and mechanism for supporting said blowpipe on said carriage in a position for making a cut in said surface, such mechanism including means for varying the angular inclination of the axis of said blowpipe with respect to said surface during movement of said carriage and blowpipe thereon from a forward inclination at the starting end of the cut to a rearward inclination at the finish portion of the cut.

2. Apparatus for thermo-chemically cutting ferrous metal bodies which comprises blowpipe means for projecting oxidizing gas against a surface of such body; a carriage; means for supporting and guiding said carriage in a direction parallel to said surface; and mechanism for supporting said blowpipe on said carriage in a position for making a cut in said surface, such mechanism including means operative during the cutting movement for varying the angular relation between the successive positions of the axis of said blowpipe and the direction of movement of said carriage so that as the blowpipe approaches the finish portion of the cut, its axis will be inclined backwardly sufficiently to insure complete severence of the body irrespective of an accumulated cutting lag.

3. Apparatus for thermo-chemically cutting ferrous metal bodies as claimed in claim 2 in which said mechanism includes a blowpipe holder pivotally mounted on said carriage; and means for tilting the holder about said pivotal mounting.

4. Apparatus for thermo-chemically cutting ferrous metal bodies which comprises blowpipe means for projecting oxidizing gas against a surface of such body; a carriage; means for supporting and guiding said carriage in a direction parallel to said surface; and mechanism for supporting said blowpipe on said carriage in a position for making a cut in said surface, such mechanism including a blowpipe holder pivotally mounted on said carriage, a cam on said carriage supporting means, and a cam follower secured to said blowpipe holder and adapted to engage said cam to tilt said holder and blowpipe thereon during the cutting movement for varying the angular relation between the successive positions of the axis of said blowpipe and the initial position of such axis so that as the blowpipe approaches the finish portion of the cut, its axis will be inclined backwardly sufficiently to insure the complete severance of the body irrespective of an accumulated cutting lag.

5. Apparatus for thermo-chemically cutting ferrous metal bodies which comprises blowpipe means for projecting oxidizing gas against a surface of such body; a carriage; means for supporting and guiding said carriage in a direction parallel to said surface; and mechanism for supporting said blowpipe on said carriage in a position for making a cut in said surface, such mechanism including a member pivotally mounted on said carriage for adjustment about an axis parallel to said surface, a blowpipe holder adjustably secured on said member, a cam on said carriage supporting means, and a cam follower secured to said member and adapted to engage said cam to swing said member and blowpipe about said horizontal axis during the cutting movement for varying the angular relation between the successive positions of the axis of said blowpipe and the initial position of such axis so that as the blowpipe approaches the finish portion of the cut, its axis will be inclined backwardly sufficiently to insure complete severance of the body irrespective of an accumulated cutting lag.

6. Apparatus for thermo-chemically cutting ferrous metal bodies which comprises a frame having ways thereon substantially parallel to a surface of said body; a carriage adapted to move along said ways; means for moving said carriage along said ways at a cutting speed; a member pivotally mounted on said carriage and pivotal about an axis substantially parallel to said surface; a blowpipe adjustably mounted on said member in a position to project a cutting stream against said surface; and a device on said frame adapted to engage said member for tilting said member and the blowpipe thereon a desired degree during the cutting movement.

7. Apparatus for thermo-chemically cutting ferrous metal bodies as claimed in claim 6 in which said device comprises a bar secured to said frame and having a cam surface engageable with follower means on said member.

8. Apparatus for thermo-chemically cutting ferrous metal bodies as claimed in claim 6 in which said device comprises a bar angularly supported on said frame, and a slider adapted to slide along said bar, said slider being pivotally connected with said member.

9. Apparatus for thermo-chemically cutting ferrous metal bodies as claimed in claim 6 in which said device comprises a cam bar adjustably supported on said frame for adjustment with respect thereto in a direction parallel to said ways, said bar having a cam surface engageable with follower means on said member.

10. Apparatus for thermo-chemically cutting ferrous metal bodies as claimed in claim 6 in which said device comprises a cam bar angularly supported on said frame, said cam bar being pivotally mounted at one end and adjustably secured at its other end whereby the angular relation of the cam surface of said bar with respect to the direction of movement of said carriage may be varied, said cam surface being adapted to engage with follower means on said member.

11. Apparatus for thermo-chemically cutting ferrous metal bodies as claimed in claim 6 in which said device comprises an auxiliary carriage movable along said frame in a direction parallel to said ways, means for positioning said carriage along said frame; and a cam bar having a cam surface angularly adjustable on said auxiliary carriage, said cam surface being adapted to engage with follower means on said member.

12. Apparatus for thermo-chemically cutting ferrous metal bodies which comprises a frame having ways thereon substantially parallel to a surface of said body; a carriage adapted to move along said ways; means for moving said carriage along said ways at a cutting speed; a cutting blowpipe; mechanism for supporting said blowpipe on said carriage in a position for making a cut in a surface of said body beginning at one edge thereof; a guide finger movably mounted on said carriage and adapted to be positioned for engaging said edge of the surface when said blowpipe is in an operating position with respect to said edge; means for relatively rapidly moving said carriage along said ways until said finger engages said edge; and means for retracting said guide finger out of the edge engaging position when said carriage is moved at cutting speed for making the cut.

13. Blowpipe apparatus which comprises a frame having ways thereon substantially parallel to a surface of said body; a carriage adapted to move along said ways; means for moving said carriage along said ways at a uniform operating speed; blowpipe means; mechanism for supporting said blowpipe means on said carriage in a position for applying gas to a surface of said body beginning at one edge thereof; a guide finger movably mounted on said carriage and adapted to be positioned for engaging said edge of the surface when said blowpipe means is in such operating position with respect to said edge; means for relatively rapidly moving said carriage along said ways until said finger engages said edge; and means for retracting said guide finger out of the edge engaging position when said carriage is moved along the ways at said operating speed.

14. Apparatus for thermo-chemically cutting ferrous metal bodies as claimed in claim 12 in which said blowpipe supporting mechanism includes means for varying the angular relation of said blowpipe with respect to said surface during the movement of said carriage at cutting speed.

15. Apparatus for thermo-chemically cutting ferrous metal bodies as claimed in claim 12 which includes means for automatically supplying oxidizing gas to said blowpipe operable by said means for retracting the guide finger; means for maintaining such gas supply during the cutting movement of the carriage; and means for automatically stopping the supply of oxidizing gas to said blowpipe and for relatively rapidly moving said carriage back to its initial position after the completion of the cut.

16. Apparatus for thermo-chemically cutting ferrous metal bodies which comprises a frame having ways thereon substantially parallel to a surface of said body; a carriage adapted to move along said ways; means for moving said carriage along said ways at a cutting speed; a cutting blowpipe; mechanism for supporting said blowpipe on said carriage in a position for making a cut in a surface of said body beginning at one edge thereof; a guide finger movably mounted on said carriage and adapted to be positioned for engaging said edge of the surface when said blowpipe is in an operating position with respect to said edge; three-position valve means; pneumatic means operable in one position of said valve means for advancing said carriage along said ways to a position where said finger engages said edge; a second pneumatic means operable in another position of said valve means and connected to retract said guide finger; an oxidizing gas valve for controlling the supply of oxidizing gas to said blowpipe; mechanism for opening said oxidizing gas valve when said second pneumatic means retracts said finger and for starting said carriage moving means to advance said carriage at cutting speed for making a cut, said mechanism being provided with locking means for holding said oxidizing gas valve open during the cutting movement; a third pneumatic means operable to move said carriage back to its initial position; an air valve operable by said carriage reaching the position in which the cut is completed, said valve being connected to supply air to said third pneumatic means, and means for causing the operation of said third pneumatic means to release said locking means and operate said mechanism to close said oxidizing gas valve before said carriage is returned to its initial position.

17. Apparatus for thermo-chemically cutting ferrous metal bodies which comprises a conveyor for horizontally supporting and longitudinally moving said body; means for stopping the movement of said body along the conveyor at a predetermined position; a frame extending transversely over said body and having horizontal ways thereon; a horizontal track disposed parallel to the direction of movement of said body; means for supporting said frame on said track for movement therealong; a cutting blowpipe; a carriage for said blowpipe movable along said ways for moving said blowpipe at cutting speed transversely across said body; and means for accurately positioning said frame along said track to adjust the position of said blowpipe longitudinally of said billet whereby equal lengths may be successively cut from said billet.

18. Apparatus for thermo-chemically cutting ferrous metal bodies which comprises a frame having ways thereon substantially parallel to a surface of said body; a carriage adapted to move along said ways; means for moving said carriage along said ways at a cutting speed; a second carriage mounted on said ways at a substantial distance from said first-named carriage and being disposed adjacent said body; means connecting said carriages whereby said first-named carriage may drive said second carriage along the frame; a cutting blowpipe; mechanism for supporting said blowpipe on said second carriage in a position for making a cut in a surface of said body beginning at one edge thereof; and means for adjusting the position of said blowpipe on said supporting mechanism operable from a position adjacent said first-mentioned carriage.

19. Apparatus for thermo-chemically cutting ferrous metal bodies as claimed in claim 18 in which said mechanism includes means for varying the angular relation of said blowpipe with respect to said surface during the movement of said carriages at cutting speed.

20. Apparatus for thermo-chemically cutting ferrous metal bodies as claimed in claim 18 in which said mechanism includes a member pivotally mounted on said second carriage for movement about an axis substantially parallel to said surface, said blowpipe being adjustably mounted on said member; and in which a device is supported on said frame and arranged to engage said member for tilting said member and the blowpipe thereon about said axis a desired degree during the cutting movement.

21. Apparatus for thermo-chemically cutting ferrous metal bodies as claimed in claim 18 which includes a third carriage movable along said frame; means operable from a position adjacent said first carriage for positioning said third carriage on said frame; and a cam mounted on said third carriage, said mechanism including a member pivotally mounted on said second carriage for movement about an axis substantially parallel to said surface, said blowpipe being adjustably mounted on said member, and said member having follower means engageable with said cam arranged for varying the angular relation of said blowpipe to said surface during cutting movement.

22. Apparatus for thermo-chemically cutting ferrous metal bodies as claimed in claim 6 in which said means for moving said carriage comprises a rack mounted on said carriage; a pinion rotatably and translatably mounted on said frame and adapted to be moved into and out of engagement with said rack; means for driving said pinion for moving said carriage at cutting speed; and means for disengaging said pinion from said rack for moving said carriage independently of said driving means.

23. Blowpipe apparatus which comprises a frame having a track member provided with at least one upper way and at least one lower way, said ways being substantially parallel to a surface of said body and to each other; a blowpipe carriage adapted to move along said track member, said carriage being provided with at least three flanged wheels two of said wheels being arranged to engage to run on one of said ways and at least one of said wheels being arranged to engage and run on the opposite one of said ways; blowpipe means; and mechanism for supporting said blowpipe means on said carriage in an operative position for projecting gas against said surface, said mechanism including means for varying the angular relation of said blowpipe with respect to said surface during movement of said carriage along said ways.

24. Blowpipe apparatus which comprises a frame having a track member provided with at least one upper way and at least one lower way, said ways being substantially parallel to a surface of said body and to each other; a blowpipe means; a blowpipe carriage having a side plate substantially parallel to said track and at least three flanged wheels mounted on one side of said side plate, two of said wheels being arranged to engage and track on said upper way and at least one of said wheels being arranged to engage and track on said lower way; and mechanism on the side of said plate opposite to the side on which said wheels are mounted for operatively supporting said blowpipe means on the carriage, said mechanism including means for varying the angular relation of said blowpipe with respect to said surface during movement of said carriage along said ways.

25. Blowpipe apparatus which comprises a supporting frame including a track having spaced apart parallel upper and lower ways, said ways being disposed parallel to a surface of said body; a blowpipe carriage adapted to move along said track, said carriage having a set of wheels adapted to engage and run on said upper ways and a set of wheels adapted to engage and run on said lower ways; a blowpipe means; and mechanism for supporting said blowpipe means on said carriage in an operative position at one side of said track, said mechanism including means for varying the angular relation of said blowpipe with respect to said surface during movement of said carriage along said ways.

HOMER W. JONES.